United States Patent [19]
Wright

[11] 3,957,284
[45] May 18, 1976

[54] MOVABLE STEPS FOR A TRANSIT VEHICLE

[75] Inventor: Raymond W. Wright, King of Prussia, Pa.

[73] Assignee: The Boeing Company, Seattle, Wash.

[22] Filed: Sept. 13, 1974

[21] Appl. No.: 505,704

[52] U.S. Cl............................ 280/166; 105/445; 182/131
[51] Int. Cl.² ........................................ B60R 3/02
[58] Field of Search ............ 280/163, 166; 105/443, 105/447, 449, 448, 445; 182/1, 131, 132

[56] References Cited
UNITED STATES PATENTS

| | | | |
|---|---|---|---|
| 1,052,364 | 2/1913 | Morris | 280/166 X |
| 1,077,644 | 11/1913 | Saunders | 105/449 |
| 1,239,892 | 9/1917 | Dunderdale | 105/449 |
| 1,449,031 | 3/1923 | Blake | 280/166 X |

*Primary Examiner*—M. H. Wood, Jr.
*Assistant Examiner*—Michael J. Forman
*Attorney, Agent, or Firm*—Joseph M. Corr

[57] ABSTRACT

A movable step assembly for use in mass transit vehicles to accommodate variations in passenger off and on loading facilities, said steps being movable from a conventional relation to permit on and off loading to street levels to an aligned, coplanar relation to permit on and off loading onto subway and other elevated platforms.

6 Claims, 7 Drawing Figures

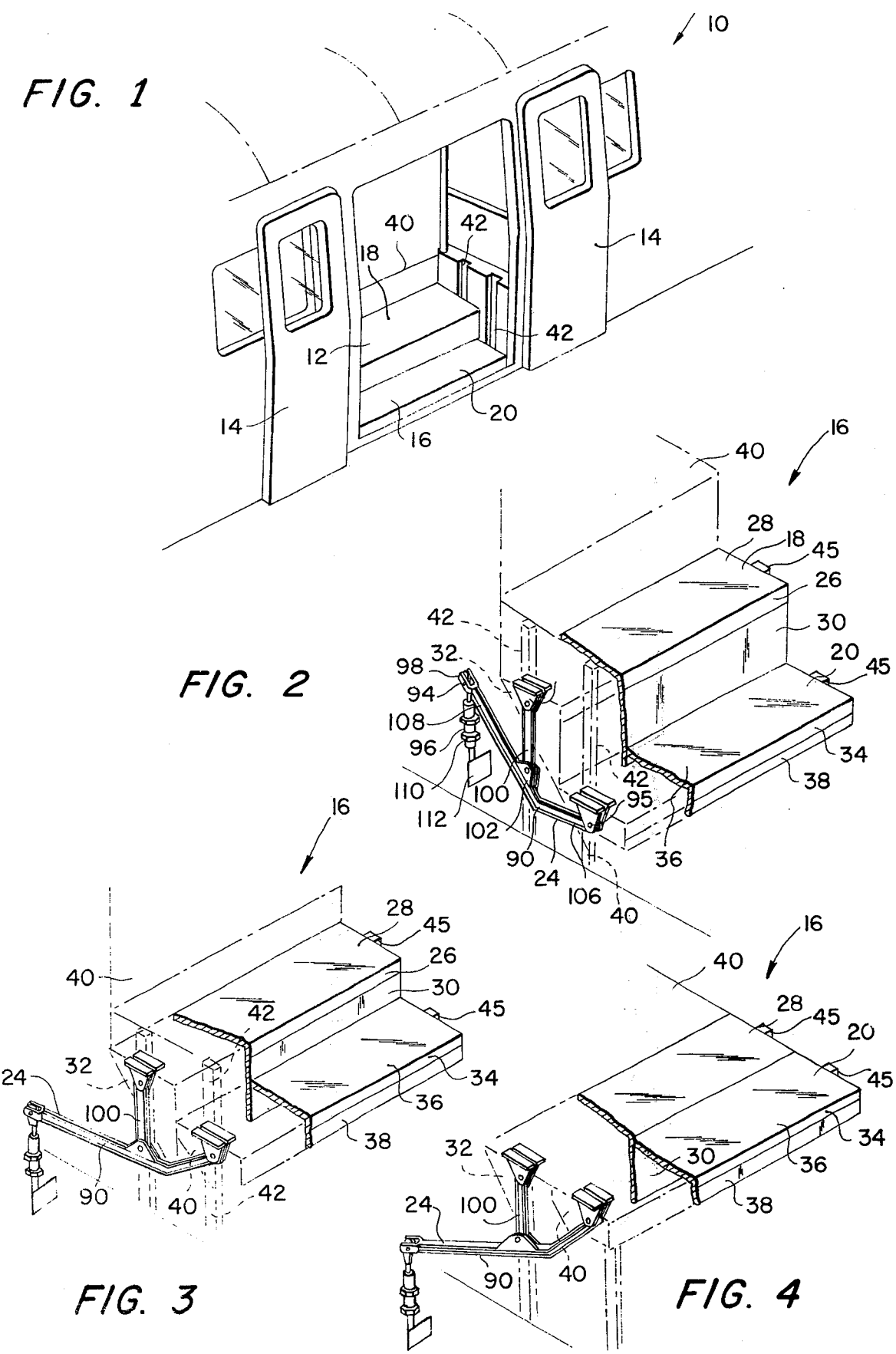

MOVABLE STEPS FOR A TRANSIT VEHICLE

BACKGROUND OF THE INVENTION

1. Field of the Invention

This invention relates to mass transit vehicles and more particularly to a stairway structure for such vehicles which will accommodate varying conditions of passenger loading and embarkation.

2. Description of the Prior Art

Considerable difficulty is experienced in adapting mass transit vehicles to variations in passenger off and on loading facilities. The situation is particularly acute where the mass transit vehicle must accommodate passengers which enter from a street level and also from subway or elevated platforms.

While various types of movable stairway structures have been developed these structures suffer from various deficiencies. For instance, a stairway structure to be operable in a practical sense in such mass transit vehicles must be capable of movement between its various operative positions while the vehicle is in motion with the doors closed and while passengers stand on the stairway surfaces. This means not only that the surfaces must be maintained during movement in a horizontal plane but also all working parts must be so positioned as not to contact the passengers and large gaps between the movable step members and the supporting or surrounding structure must be avoided.

Accordingly, it is a primary object of this invention to alleviate the aforementioned difficulties of the art by providing a new and novel movable step assembly.

It is also an object of this invention to provide such a step assembly which is capable of facilitating passenger movement to and from at least two different elevations such as a loading platform and a street level.

It is a further object of this invention to provide such a step assembly which will be safely operable while the vehicle is in service and even while passengers are standing on the step assembly.

An object of this invention is to provide for purely vertical movement of the steps so that the steps may be raised and lowered during movement of the vehicle with passengers on said stairs and while the vehicle doors are in a closed position.

As an additional object of this invention, a step assembly is provided which has no exposed linkages or protruding parts and has no large gaps between the movable steps and the surrounding structure in which passengers or their clothing might be caught and serious damage caused.

It is also an object of this invention to provide such a step assembly which may be simply and inexpensively constructed and easily maintained and very reliable in operation.

Additional objects and advantages of this invention will be set forth in part in the description which follows and in part will be obvious from the description or may be learned by practice of the invention. The objects and advantages of the invention may be realized and obtained by means of the instrumentalities and combinations particularly pointed out in the appended claims.

SUMMARY OF THE INVENTION

To achieve the foregoing objects in accordance with the purpose of this invention as embodied and broadly described herein, the movable step assembly is comprised of a frame, a first step member operatively mounted to said frame, said step member having a horizontally disposed upper surface at a first elevation and a second step member operatively mounted to said frame, said second step member having a horizontally disposed upper surface at a second elevation, lower than said first elevation. Means operatively associated with said step members are provided for raising one of said step members vertically to a third elevation spaced above said first elevation while maintaining the upper surface of said raised step member in a horizontal position. Linkage means are also provided connecting said first and second step members and being responsive to the raising of the step member for elevating the other of said step members vertically to the third elevation while maintaining the upper surface of said step member in a horizontal position so that the upper surfaces of said first and second step members are disposed in the same plane at the third elevation.

The linkage means are comprised of a first linkage arm having first and second ends, said first end being pivotally mounted to said second step member, means for mounting said second end to the frame on the opposite side of said first step member to permit pivotal movement of said arm about a point, said pivot means providing reciprocal swinging movement of said pivot point toward and away from said step members and a second linkage arm pivotally connected to said first linkage arm intermediate its ends and pivotally connected to said first step member.

BRIEF DESCRIPTION OF THE DRAWINGS

The invention consists of the novel parts and structures, arrangements, combinations and improvements shown and described. The accompanying drawings which are incorporated in and constitute a part of the specification, illustrate an embodiment of the invention and together with the description serve to explain the principles of the invention.

FIG. 1 is a perspective view of a doorway of a mass transit vehicle having a stairwell and showing a movable step assembly mounted therein.

FIG. 2 is a perspective view of the movable step assembly of this invention with a portion of the step members broken away to show the linkage means. The step members are shown in the down position.

FIG. 3 is a perspective view of the step members with a portion broken away to show the linkage means, the step members being in an intermediate position between their raised and down positions.

FIG. 4 is a perspective view of the step members with a portion broken away showing the linkage means with the step members being in a raised position.

DESCRIPTION OF THE PREFERRED EMBODIMENTS

Figure 5:
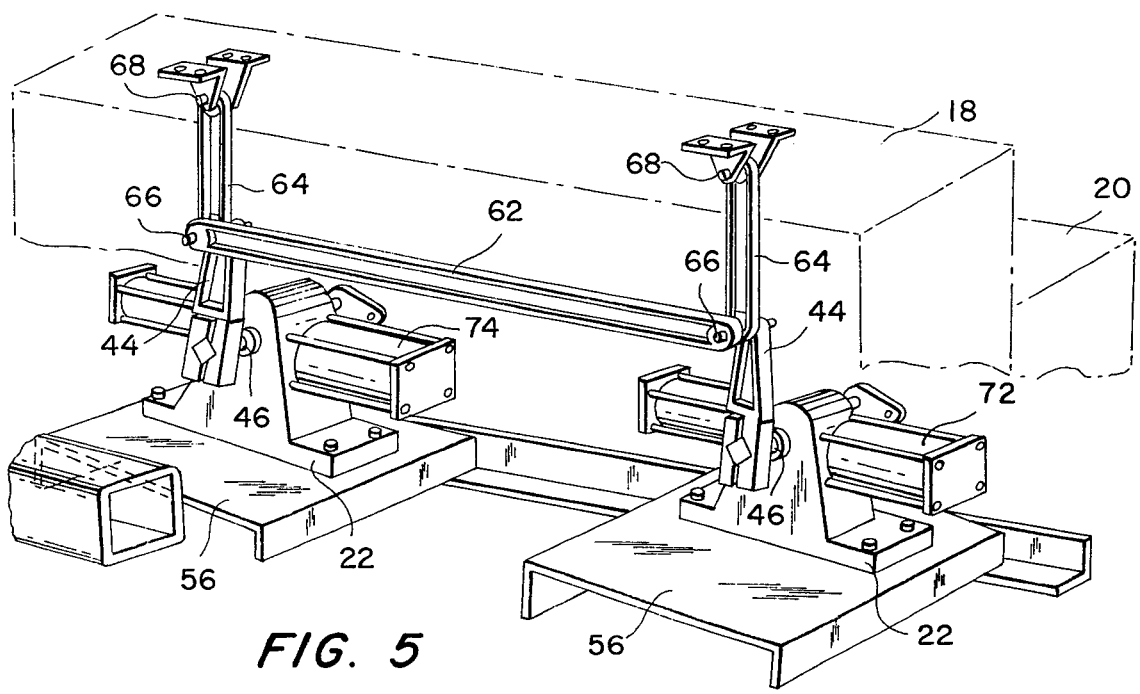
FIG. 5 is a perspective view of the assembly utilized for raising and lowering one of the step members, the step members being shown by broken lines.
Figure 6:
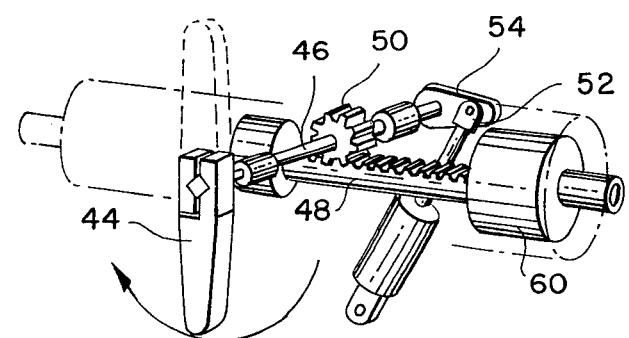
FIG. 6 is a perspective view of the driving assembly which operates a crank member for raising and lowering the step members.

Referring to FIG. 1 of the drawings, mass transit vehicle 10 is illustrated having a stairwell 12 positioned at the doors 14. Located within the stairwell 12 is a movable step assembly 16. The step assembly 16 is generally comprised of a first step member 18, a second step member 20, means 22 for raising and lowering one of the step members 18 or 20 and linkage means 24 connecting the first and second step members 18 and 20, respectively. This embodiment is shown for purposes of illustration of the inventive concept. Other and different components of the combinations may be substituted to accomplish the desired end results.

In accordance with this invention, the first step member 18 defines a horizontally disposed upper surface positioned at a first elevation. Step member 18, as illustrated, is comprised of a horizontally disposed upper member 26 defining a horizontal stepping surface 28, a vertical wall 30 at the front edge of member 26 and extending downwardly past the second step member 20 and side walls 32. Vertical wall 30 provides a vertical surface against which the second step member 20 is snugly fit for vertical reciprocal movement of the first step member 18 relative to step member 20 without producing a sizable gap between the movable step members.

In accordance with the invention the second step member 20 defines a horizontally disposed upper surface of a second elevation lower than said first elevation. Step member 20, as illustrated, is constructed similarly to first step member 18 having an upper horizontal member 34 defining a horizontally disposed stepping surface 36. Front and side walls 38 and 40 respectively are also provided but do not extend as deeply as in the case of step member 18.

In the down position, as illustrated in FIG. 2, the upper stepping surface 28 of the first step member 18 is positioned at a first elevation and the surface 36 of the second step member 20 is positioned at a second lower elevation. In this position, a passenger may be loaded from a street level stepping up to the floor 40 of the mass transit vehicle 10. The step assembly 16 is operable to raise surfaces 36 and 28 to a third elevation in aligned coplanar relation with the floor 40 of the mass transit vehicle 10, as illustrated in FIG. 4. In this position passengers may enter or exit onto a platform which is roughly the same level as the floor 40.

Preferably, guides 42 are provided in the stairwell 12 to guide the vertical movement of the first and second step members 18 and 20 respectively between their elevated and down positions. Slides 45 on the side walls 32 and 40 of the first and second step members 18 and 20 are received in the guides 42 so as to effectively control the movement of the step members 18 and 20.

In accordance with the invention, the means 22 for raising and lowering the step members is comprised of a crank 44 and drive means for rotating said crank about an axis and through an operating arc from a first position where the steps are down to a second position where the steps are raised. The second position of the crank is on the opposite side from said first position of a vertical plane through said axis such that pressure on the step will not exert a force on the crank to return the crank to its down position through its operating arc.

In the illustrated embodiment, the crank 44 is operatively keyed to a shaft 46, the shaft 46 is rotatably driven by a conventional rack and pinion arrangement comprised of a rack 48 and a pinion 50. The rotation of the shaft 46 is slowed by a dampening assembly 52 operatively connected to a crank 54 mounted on the opposite end of shaft 46.

The driving means 22 is mounted to a frame member 56 which inclines the driving means 22 at approximately a 5° angle from the horizontal. In this manner, an 180° swing of crank 44 through its operating arc occurs from roughly 5° to 185°. Thus, a conventional rack and pinion driven crank assembly may be utilized but the crank when in its upright position is over center such that a downward pressure on the crank forces the crank away from its operating arc thereby forcing the pinion 50 against a stop member 60. This provides an added safety factor when passengers are riding on the steps so that the steps will not accidentally shift to a down position.

In the illustrated embodiment, a pair of driving means 22 are employed beneath the first step member 18. The cranks 44 of the respective driving means 22 are operatively connected by a synchronization bar 62 to insure a synchronization of movement of the cranks 44. The cranks are connected to step member 18 by means of a linkage 64 which is pivotally connected at 66 to the crank 44 and pivotally connected to the undersurface of the upper step member 26 of step 18 by pivotal connection 68.

In this manner, as the crank is rotated upwardly to its second position which moves the step member 18 to its raised position, the crank moves through an operating arc which extends beyond a vertical plane through the axis of shaft 46. Weight then exerted on the step 18 forces the crank in the opposite direction from its operating arc and against stop member 60 providing an added safety factor against the step returning to its lowered position.

Figure 7:
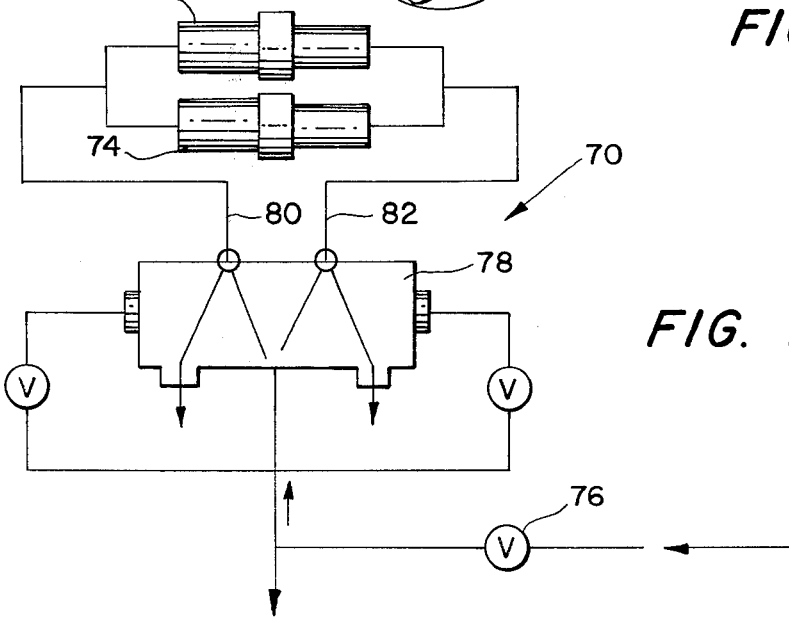
FIG. 7 is a schematic drawing of the pneumatic drive system employed for raising and lowering the step members.

Referring to FIG. 7, a pneumatic system 70 is disclosed for selectively providing the required air pressure to cylinders 72 and 74 which are employed to drive racks 48 causing rotation of cranks 44. A single air feed is provided through valve 76 to a manifold 78 where branch lines 80 and 82 connect the cylinders 72 and 74. The branch lines 80 and 82 operate both as air feeds and air exhausts.

The preferred embodiment is disclosed herein; however, other mechanical expedients may be utilized as a means 22 for raising and lowering the step members 18 and 20. The substitution of such expedients will not change the inventive concept described in this application.

In accordance with the invention, a linkage means 24 is provided connecting the first and second step members 18 and 20 respectively and is responsive to the raising of one of the step members to a third elevation to raise the other of said step members to the third elevation while maintaining the upper surface of the step members in a horizontal position. The upper surfaces of said first and second step members are disposed in the same plane at the third elevation.

The linkage 24 is comprised of a first linkage arm 90 having first and second ends 92 and 94. The first end 92 of linkage arm 90 is pivotally connected to the second step member 20 at 95. Pivot means 96 is provided for mounting the second end 94 of linkage arm 90 to the frame of the vehicle 10 on the opposite side of the first step member 18. The pivot means 96 permits pivotal movement of the linkage arm 90 about a pivot point 98 while also providing for reciprocal swinging movement of the pivot point 98 toward and away from the step members 18 and 20. The linkage 24 also includes a second linkage arm 100 which is pivotally connected to the first linkage arm intermediate its ends 92 and 94 and pivotally connected to the first step member 18.

Preferably the first linkage arm 90 is bent having a first portion 106 extending from the pivotal connection 95 to the first step member and a second portion 108 extending upwardly and away from said first step member to its pivotal connection 98 to the pivot means 96.

Preferably the pivot means 96 is comprised of a third linkage arm 110 extending from its pivotal connection 98 to the second end 94 of the first linkage arm 90 to a pivotal connection 112 to the frame of the vehicle 10. The third linkage arm 110 is swingable about the frame connection to permit swinging movement of the pivot point 98 toward and away from the step members 18 and 20. In the illustrated embodiment, the third linkage arm is comprised of a turn buckle assembly to permit adjustment of the length of the third linkage arm and thereby adjust the swinging movement of the pivot point 98.

As best illustrated in FIG. 3, the second linkage arm 100 is located at a point equal distance between the ends 92 and 94 of the first linkage arm 90. In this manner a 2:1 ratio of movement is provided between step member 20 and step member 18.

As may be seen in FIGS. 2 through 4, in sequence, the step members 18 and 20 are, in FIG. 2, in conventional step relation to provide access to the floor 40 of the vehicle 10 through the stairwell 18 from a typical street level. In order for the step assembly 16 to accommodate on and off loading of passengers from and to a platform at roughly the same level as floor 40 of the vehicle, the step members 18 and 20 are moved to coplanar relation, as illustrated in FIG. 4.

To accomplish this position shift, the pneumatic system is activated to drive racks 48 by air cylinders 72 and 74 causing cranks 44 to rotate to an upright position. The rotation of cranks 44 raise step member 18 to the third elevation level with the floor 40.

The raising of the first step member 18 in the manner just described to the third elevation causes the linkage arm 90 to rotate about pivot point 98 and for pivot point 98 to swing rearwardly. The first pivot arm 90 rotates about pivot connection 102 whereby the linkage arm 90 is moved to a position illustrated in FIG. 4 where the end 92 of linkage arm 90 extends upwardly from the pivot connection 102. In this manner the movement of the first step member 18 is multiplied to provide a movement of twice the distance of movement of step member 18 to the second step member 20.

The step member 20 remains adjacent the vertical wall 30 of the first step member 18 during the step elevating and lowering operation. In this manner no large gaps occur in the step structure which could endanger passengers. The linkage arms 90 and 100 must therefore be so positioned that movement of step member 20 is responsive to the raising of step member 18 in such a manner that the upper panel of step member 20 moves along but always adjacent the vertical wall 30 of step member 18 as step member 18 is being raised or elevated. This relationship is illustrated in FIG. 3 where both steps are in a partially elevated position. The same relationship of step member 20 to vertical wall 30 prevails during lowering of the step members 18 and 20.

It is contemplated that changes may be made to the linkage means 24 described herein without departing from the broad inventive concept. Other linkage means may be employed, however, particularly good results are obtained by linkage means 24. Moreover, linkage means 24 provides for an inexpensive stairway structure that is simple to manufacture, install and maintain.

It will be apparent to those skilled in the art that various modifications and variations could be made in the apparatus constituting this invention without departure from the scope and spirit of the invention.

What is claimed is:
1. Movable steps for use on vehicles to facilitate movement of passengers to or from said vehicle comprising:
   a. a frame,
   b. a first step member operatively mounted to said frame having a horizontally disposed upper surface,
   c. a second step member operatively mounted to said frame having a horizontally disposed upper surface,
   d. means operatively associated with said step members for varying the vertical position of said step members between a first position wherein the step members are at different vertical heights to serve as entry stairs, to a second position wherein the step members are both level with the floor of the vehicle to form a platform, while maintaining the upper surfaces of said step members in a horizontal position, comprising a rotatably driven crank member operatively connected to a step member and wherein the rotatably driven crank is driven about its axis through an operating arc which extends from a first position wherein the step is in its down position to a second position wherein the step is in a raised position, said second position being on the opposite side from first position of a vertical plane through the axis so that a force such as the weight of a passenger standing on the step member forces said crank away from its operating arc,
   e. linkage means pivotally connecting said first and second step members to the frame comprising:
      1. a first linkage arm having first and second ends;
      2. pivotal mounting means connecting the first end of the first linkage arm to the second step member;
      3. pivotal mounting means connecting the second end of the first linkage arm to the frame such that the pivot point of said pivotal mounting means is permitted to move toward and away from the step members as the step members change vertical positions; and
      4. a second linkage arm pivotally connected to said first linkage arm intermediate its ends and pivotally connected to said first step member.

2. Movable steps as recited in claim 1 wherein said first step member includes a front wall extending downwardly past the upper surface of said second step member and said upper surface of the second step member having its rearward edge adjacent said wall and wherein said linkage means varies the vertical position of said step members while maintaining said rearward edge adjacent to said front wall surface during said movement.

3. Movable steps as recited in claim 1 wherein the pivotal mounting means of the second end of the first linkage arm is comprised of a third linkage arm extending from said pivotal connection of the second end of said first linkage arm to a pivotal connection at said frame, said third linkage arm being swingable about said frame connection to permit the swinging movement of said pivot point toward and away from said step members.

4. Movable steps as recited in claim 1 wherein said second linkage arm is connected to said first linkage arm midway between the pivotal connections of said ends of the first linkage arm.

5. Movable steps as recited in claim 1 wherein said rotatably driven crank is driven by a rack and pinion assembly, one end of said rack terminating at a stop member, said pinion being positioned against said stop member when the step member is in its raised position preventing further rotation of the crank except by movement back through the operating arc.

6. Movable steps as recited in claim 1 wherein a second rotatably driven crank member is operatively connected to the same step member as the first rotatably driven crank, and wherein a synchronization bar connects the two rotatable cranks, each of said cranks being connected to said step member by a linkage arm pivotably connected to said step member and said crank.

* * * * *